United States Patent [19]
You

[11] Patent Number: 6,064,935
[45] Date of Patent: May 16, 2000

[54] APPARATUS FOR DETERMINING AN OPTIMAL TRANSMISSION SPEED FOR AN AUTOMOTIVE VEHICLE AND RELATED METHODS THEREOF

[75] Inventor: Jin-Ho You, Kyunggi-Do, Rep. of Korea

[73] Assignee: Hyundai Motor Co., Seoul, Rep. of Korea

[21] Appl. No.: 08/771,656

[22] Filed: Dec. 23, 1996

[30] Foreign Application Priority Data

Dec. 28, 1995 [KR] Rep. of Korea .................. 95-61958

[51] Int. Cl.⁷ .................. B60K 17/06; B60K 41/06
[52] U.S. Cl. .................. 701/55; 701/64; 701/51; 701/52; 701/53
[58] Field of Search .................. 701/55, 64, 51, 701/53

[56] References Cited

U.S. PATENT DOCUMENTS

| | | | |
|---|---|---|---|
| 5,089,963 | 2/1992 | Takahashi | 701/55 |
| 5,510,982 | 4/1996 | Ohnishi et al. | 701/55 |
| 5,726,889 | 3/1998 | Shinojima et al. | 701/55 |

*Primary Examiner*—William A. Cuchlinski, Jr.
*Assistant Examiner*—Olga Hernandez
*Attorney, Agent, or Firm*—Finnegan, Henderson, Farabow, Garrett & Dunner, L.L.P.

[57] ABSTRACT

An apparatus and related methods for controlling the operation of an automatic transmission for an automotive vehicle comprising a device for shifting the transmission from a first transmission gear speed to a second transmission gear speed in accordance with a predetermined transmission shift pattern; a device for detecting an engine condition of the vehicle; and a device for automatically shifting back the transmission from the second transmission gear speed to the first transmission gear speed based on the engine condition within a predetermined time period after the shifting of the transmission from the first transmission gear speed to the second transmission gear speed is initiated.

8 Claims, 5 Drawing Sheets

APPARATUS FOR DETERMINING AN OPTIMAL TRANSMISSION SPEED FOR AN AUTOMOTIVE VEHICLE AND RELATED METHODS THEREOF

BACKGROUND OF THE INVENTION

1. Field of the Invention

The present invention relates to an apparatus for determining an optimal transmission gear speed for an automotive vehicle having an automatic transmission and related methods therefor.

2. Discussion of Related Art

In an electronically controllable automatic transmission one of the functions provided by its Transmission Control Unit ("TCU") includes selecting a proper transmission gear speed in reference to a two-dimensional plane, which is made of the extent of opening of the throttle valve (i.e., represents the load to the engine) and the speed of the vehicle. More specifically, in controlling the operation of the automatic transmission, the TCU sets a transmission shift pattern in reference to the extent of opening of the throttle valve and the speed of the vehicle, and stores data representing the pattern therein. Then, the TCU selects a target transmission shift speed for the vehicle in accordance with transmission shift pattern, and generates a command signal to effect the actual shifting to the target speed in the transmission, through controlling of various valves therein.

However, since a conventional transmission shift pattern is set in reference to the driving state of the vehicle based on the above two-dimensional plane, variations in the driving state due to other factors, such as the driver intending to accelerate or decelerate the vehicle while driving on a slope or steered road, or problems resulting from abrasions of the engine or transmission gear box, etc., cannot be compensated for.

SUMMARY OF THE INVENTION

Accordingly, the present invention is directed to an apparatus for determining an optimal transmission gear speed for an automotive vehicle having an automatic transmission which overcome such limitations and disadvantages of the prior art.

According to one aspect of the present invention, as broadly defined and embodied herein, an apparatus for controlling the operation of an automatic transmission for an automotive vehicle comprises means for shifting the transmission from a first transmission gear speed to a second transmission gear speed in accordance with a predetermined transmission shift pattern; means for detecting an engine condition of the vehicle; and means for automatically shifting back the transmission from the second transmission gear speed to the first transmission gear speed based on the engine condition within a predetermined time period after the shifting of the transmission from the first transmission gear speed to the second transmission gear speed is initiated.

According to another aspect of the present invention, a method for controlling the operation of an automatic transmission for an automotive vehicle comprises the steps of shifting the transmission from a first transmission gear speed to a second transmission gear speed in accordance with a predetermined transmission shift pattern; detecting an engine condition of the vehicle; and automatically shifting back the transmission from the second transmission gear speed to the first transmission gear speed based on the detected engine condition within a predetermined time period after the shifting of the transmission from the first transmission gear speed to the second transmission gear speed is initiated.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are intended to provide a further understanding of the invention and are incorporated in and constitute a part of this specification, illustrate an embodiment of the invention and together with the description serve to explain the principles of the drawings:

DETAILED DESCRIPTION OF THE PREFERRED EMBODIMENT

Reference will now be made in detail to the preferred embodiment of the present invention, examples of which are illustrated in the accompanying drawings.

Figure 1:
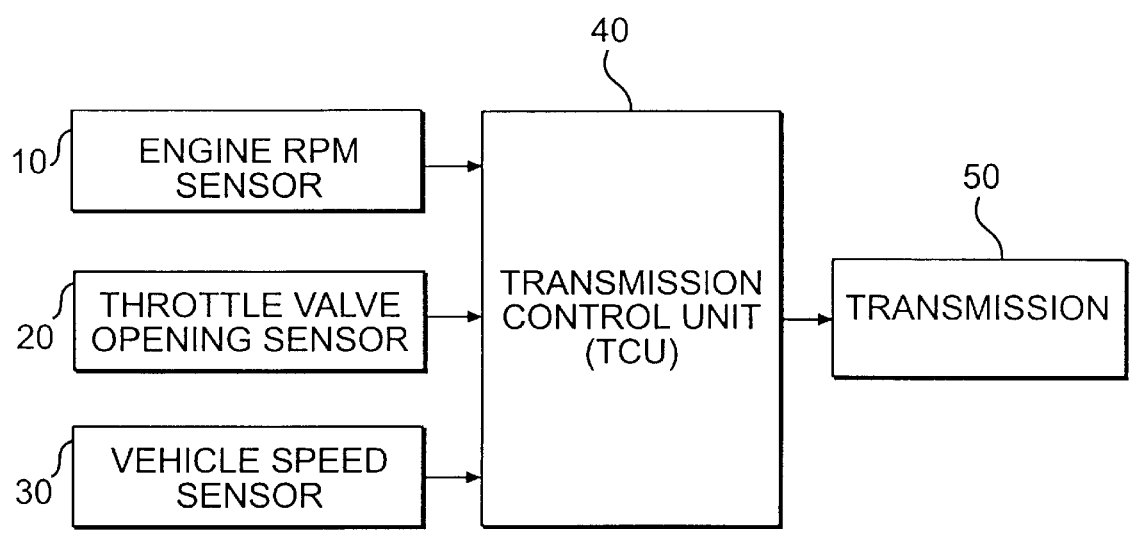
FIG. 1 is a block diagram showing an apparatus for setting a transmission gear speed in accordance with an embodiment of the present invention.

Referring to FIG. 1, an apparatus of the present invention, as embodied herein, includes an engine rpm sensor 10; a throttle valve opening sensor 20, which is coupled to the accelerator pedal, for sensing the extent of opening of the throttle valve, a vehicle speed sensor 30 for sensing the speed of the vehicle speed, which is equivalent to the output rpm of the transmission gear box; a transmission control unit ("TCU") 40, which is coupled to the sensors 10, 20, and 30; and a transmission portion 50, which is coupled to the TCU 40.

According to the present invention, as embodied herein, the TCU 40 controls the operation of the transmission in accordance with a predetermined transmission shift pattern in response to the signals provided from the sensors 10, 20, and 30. After a shifting (up or down) from an original transmission gear speed to a target transmission gear speed is initiated in accordance with the predetermined transmission shift pattern, the TCU 40 computes the engine torque (Te) and the driving torque (Td), and determines whether it is necessary to shift back the transmission to the original transmission gear speed based on the computed engine and driving torques. The transmission portion 50 effects the shifting back of the transmission by using a friction factor in response to the result of the determination.

The operation of the apparatus of the present invention, as embodied herein, is described hereinafter. The TCU 40 in the apparatus defines a predetermined transmission shift pattern and stores it therein to control the shifting in the transmission. As the vehicle is operated, the TCU 40 senses the extent of opening of the throttle valve, which is coupled with the accelerator pedal, and the vehicle speed, and controls the operation of the transmission to effect the shifting from a current transmission gear speed (referred to as the "INITIAL" speed) to a target transmission gear speed (referred to as the "END" speed) in accordance with the predetermined transmission shift pattern with respect to the sensed extent of opening of the throttle valve and speed of the vehicle. However, under some special circumstances, the TCU 40 controls the operation of the transmission to shift it back from the END speed to the INITIAL speed independent of predetermined transmission shift pattern after the shifting from the INITIAL to the END speed is initiated.

For example, the driver may manipulate the extent of opening of the throttle valve while driving on down-hill or up-hill to manually control the acceleration of the vehicle. More specifically, "kick down" phenomena occur when the driver operates the acceleration pedal to increase the extent of opening of the throttle valve, for example, from a 10% to a 50%. There are two circumstances in which the kick down occurs: first when the driver intends a quick acceleration; second, when the driver intends to compensate for driving resistance when driving on an uphill road.

Figure 3:
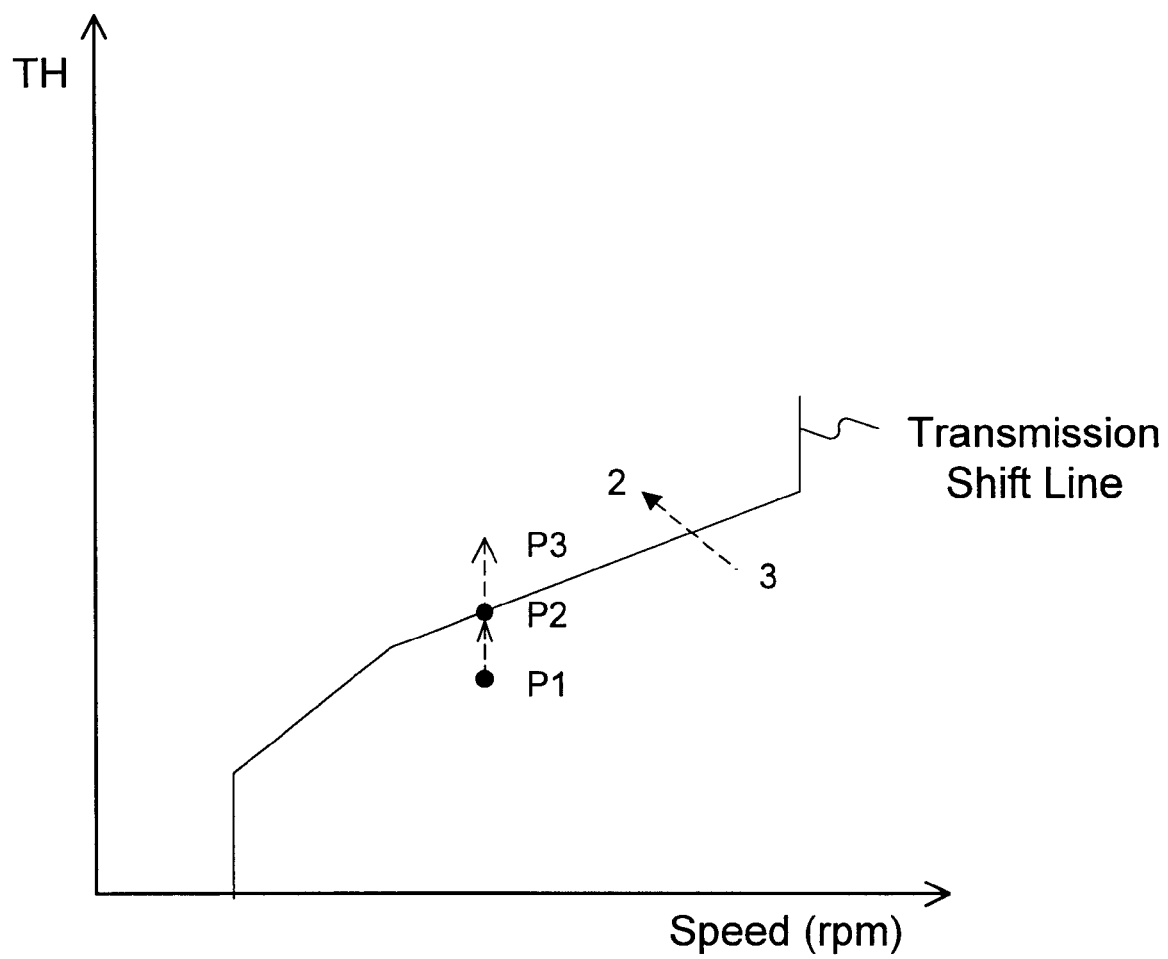
FIG. 3 is a transmission shift pattern in reference to the extent of opening of the throttle valve in accordance with the embodiment of the present invention.
Figure 4:
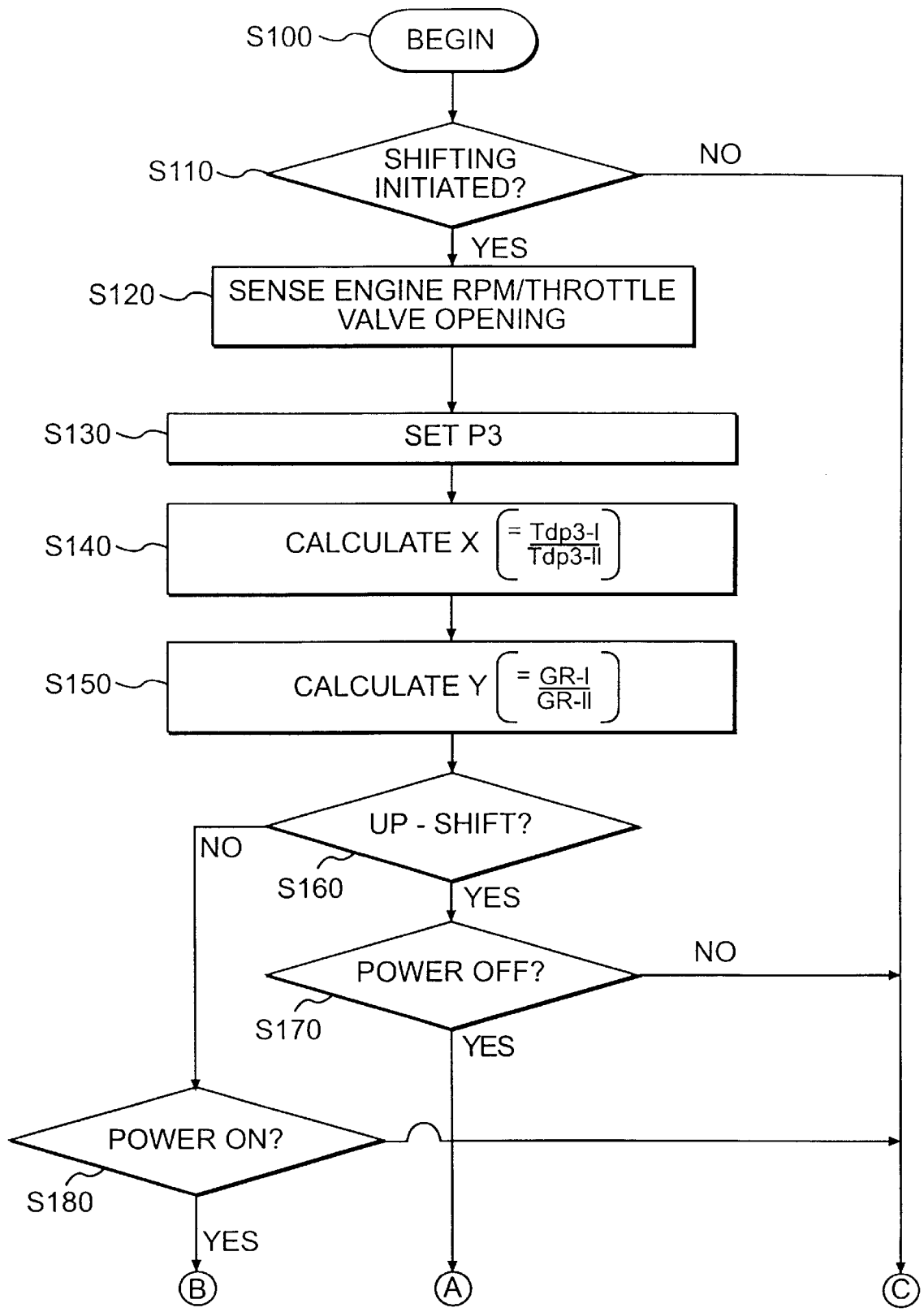
FIG. 4 (parts A and B) is a flowchart representing the operation of the apparatus of FIG. 1 in accordance with the embodiment of the present invention.
Figure 4:
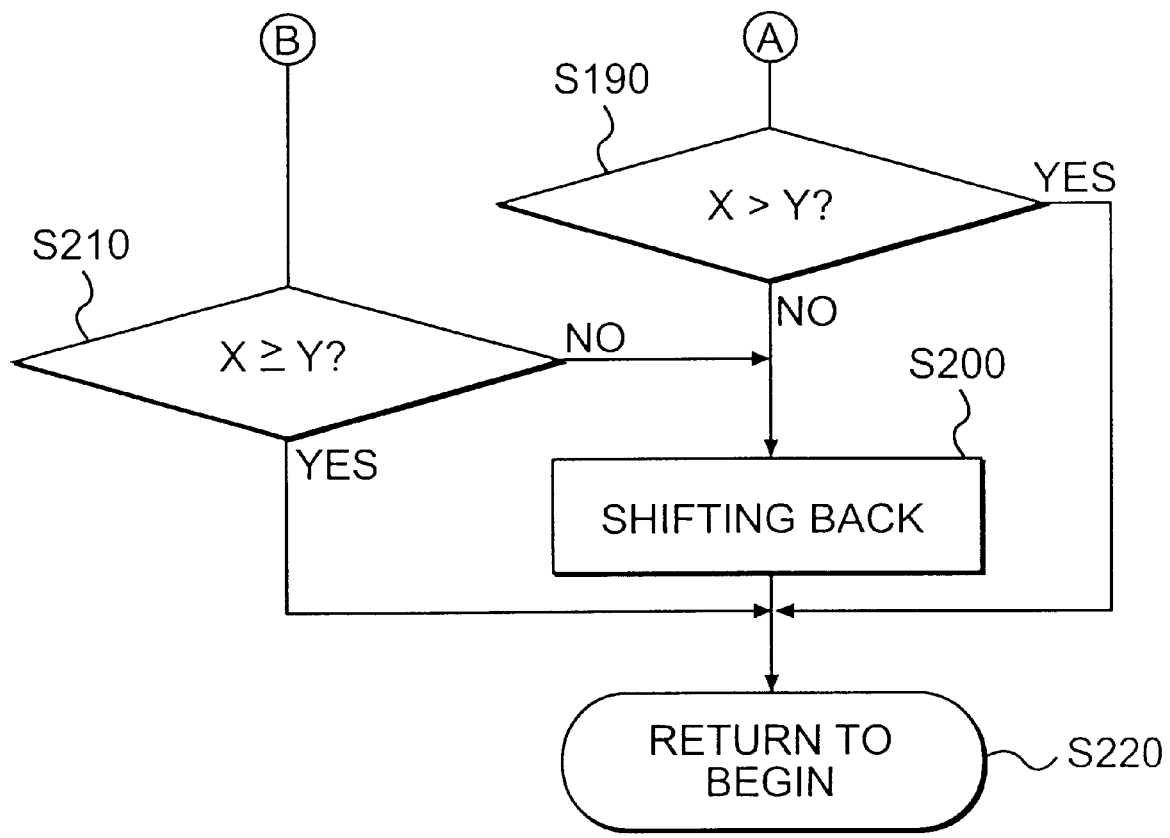

Referring to FIG. 4, in both circumstances, the TCU 40 checks whether the transmission shifting according to the predetermined transmission shift pattern with respect to the vehicle speed and the extent of opening of the throttle valve corresponding to a vehicle's driving state has been completed from the INITIAL speed to the END speed (e.g., from a 3rd speed to a 2nd speed as shown in FIG. 3). (S100) (S110)

Then, the TCU 40 senses the vehicle speed (e.g., engine rpm) and the extent of opening of the throttle valve representing the current driving state of the vehicle (S120).

Referring to FIG. 3, supposedly the driver operates the accelerator pedal to manipulate the opening of the throttle valve. In response to the operation of the acceleration pedal, the following three points P1, P2 and P3 are established with respect to the extent of opening of the throttle valve:

P1: an initial starting point for opening the throttle valve when the acceleration pedal is first operated, at which point $dTHo/dt=0$;

P2: an intermediate point at which a transmission shift line (e.g., shift 3→2) in the predetermined transmission shift pattern is crossed; and

P3: an end point, at which $dTHo/dt=0$, after the operation of the acceleration pedal and the corresponding manipulation of the throttle valve is completed. The opening of the throttle valve is manipulated in a sequence of P1->P2->P3 according to the predetermined transmission shift pattern, i.e., a kick down from the "3rd" speed to the "2nd" speed, in a "POWER ON" state of the throttle valve.

The intermediate point P2 becomes a point at which the transmission shift line is crossed, i.e., the shifting from the 3rd to the 2nd speed according to the predetermined transmission shift pattern is initiated. Then, the TCU 40 estimates what the position of the end point P3 would be. At P3, the manipulation of the opening of the throttle valve is finished. Although the accurate estimation is not possible, it is possible to estimate the position of the P3 accurate enough for practical purposes by analyzing the extent of opening of the throttle valve as it is manipulated.

The TCU 40 estimates the position of the end point P3, at which $dTHo/dt=0$, where the manipulation of the opening of the throttle valve is finished by continuously sensing variations in the extent of opening of the throttle valve after passing the point P2, i.e., crossing the transmission shift line. When the TCU senses no increase in the extent of opening of the throttle valve (i.e., a decrease in the extent of the opening or the closing of the throttle valve), the TCU 40 sets the end point P3 at that point. If the extent of opening of the throttle valve continues to increase during a 100 msec time period after passing the P2, the point P3 is set at the end of the 100 msec period.

Since the extent of opening the throttle valve varies at a rate of approximately 50%/0.2 sec during the kick down, the effect of the 100 msec time delay on the transmission shifting is minimal. As described above, when the manipulation of the opening of the throttle valve is finished, and the position of the point P3 on the transmission shift pattern, at which $dTHo/dt=0$, is estimated and set. (S130)

The TCU 40 then calculates a driving torque Tdp3-I with respect to the point P3 at the INITIAL transmission gear speed and a driving torque Tdp3-II at the END transmission gear speed by using the relation:

$$Tdp3\text{-}I=Tep3\times GR\text{-}I$$

$$Tdp3\text{-}II=Tep3\times GR\text{-}II$$

Where Tep3 represents an engine torque with respect to the P3, and GR-I representing a gear ratio corresponding to the INITIAL transmission speed, and GR-II representing a gear ratio corresponding to the END transmission speed.

Then, a ratio X representing (Tdp3-I/Tdp3-II) is calculated. (S140). A ratio Y representing (GR-I/GR-II) is also calculated. (S150)

The TCU 40 checks whether the change in the extent of opening of the throttle valve requires an "up-shift." (S160) If so, the TCU 40 checks whether the current driving state of the vehicle is a POWER-OFF state (i.e., the engine is operated according to the inertia force of the vehicle). (S170)

If it is checked that the change in the extent of opening of the throttle valve does not require the "up-shift," the CPU checks whether the current driving state of the vehicle is a POWER-ON state (i.e., the vehicle is operated by the engine). (S180)

There are four circumstances where transmission shifting occurs regardless of the transmission speed: 1) POWER-ON "up-shift"; 2) POWER-ON "downshift;" 3) POWER-OFF "up-shift;" and 4) POWER-OFF "down-shift."

The two of the above circumstances which are more relevant to the present invention, as embodied herein, are the POWER-ON down-shift and the POWER-OFF up-shift, i.e., a kick down state in response to a variation in the extent of opening of the throttle valve, or a lift foot up (commonly referred to as "LFU") state in which the driver suddenly lifts his foot from the accelerator pedal, respectively.

Figure 2:
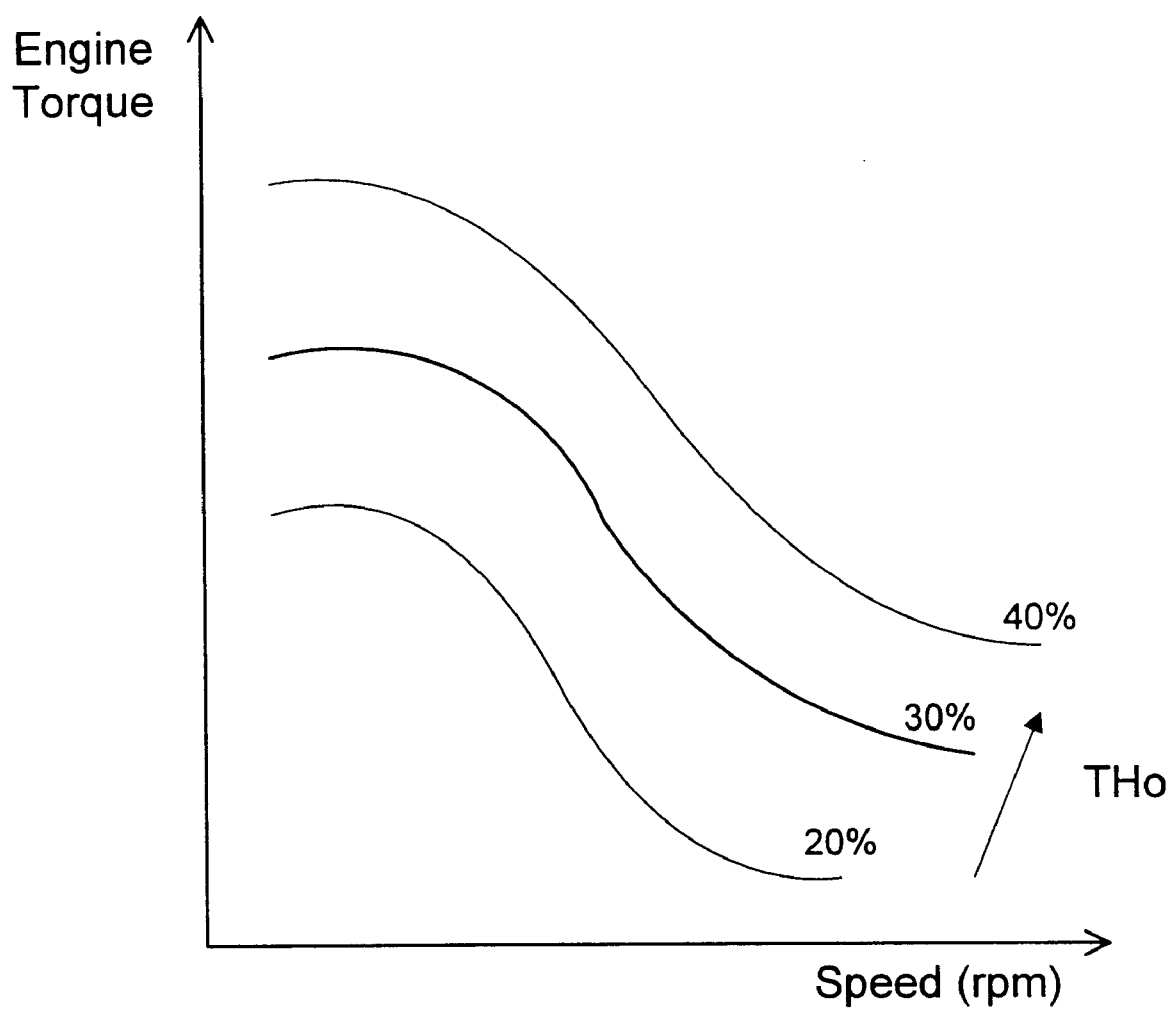
FIG. 2 is a transmission shift pattern while the vehicle is in a POWER-ON state in accordance with the embodiment of the present invention.

The POWER-ON down-shift occurs during the kick down or driving on an uphill, when the driver intends to increase the acceleration of the vehicle. Referring to FIG. 2, the engine torque varies with the speed of the vehicle (i.e., engine rpm) depending on the extent of opening of the throttle valve (THo). Further, a smooth acceleration is obtained without reducing the rate of acceleration during the up-shift when the amount of increase in the engine torque due to a decrease in the engine rpm exceeds the amount of increase in the driving torque due to a decrease in the gear ratio.

The POWER-OFF up-shift occurs during the LFU, when the driver intends to reduce or maintain acceleration of the vehicle. During the up-shift, the gear ratio and the driving torque decrease, and the engine torque increases as the engine rpm decreases. Accordingly, since during the up-shift, whether the total driving torque due to the change in the gear ratio and the engine torque increase or decrease should be determined, if the redundant driving power is reduced or maintained, the shifting is effected. In this situation if the shifting is effected when the redundant driving power increases, the vehicle is accelerated regardless of the driver's intention.

Further, referring to FIG. 4, when the current driving state of the vehicle is the POWER-OFF up-shift, the TCU 40 checks whether a condition X<Y is met. (S 190) If the condition (X<Y) is not met, the TCU 40 judges that the redundant driving power be increased, shifting back the transmission gear speed from the END speed to the INITIAL speed. (S200) If the condition is met, then the operation returns to the beginning. (S220)

When the current driving state of the vehicle is the POWER-ON down-shift, the TCU 40 check whether a condition (X≧Y) is met. (S210) If the condition (X≧Y) is not met, the TCU 40 judges that the redundant driving power be increased, shifting back the transmission gear speed from the END speed to the INITIAL speed. (S200) If the condition is met, the operation returns to the beginning. (S220)

In the above, if the redundant driving power is increased, to achieve a smooth shifting without reducing the acceleration of the driver's intent, the TCU 40 causes the shifting back of the transmission from the END speed to the INITIAL speed. Then, the TCU 40 controls the driving condition of the vehicle by running a vehicle running routine after a predetermined time elapses. Further, referring to FIG. 3, when the sifting back is effected, the TCU 40 causes the transmission shift line to be shifted upwardly to coincide with the end point P3 at which the line is crossed when the shifting is effected.

As described above, if the transmission shifting is achieved by satisfying conditions according to the engine torque estimation routine, as embodied herein in accordance with the present invention, the transmission back shifting is delayed because of the time lapse between the actual shifting back and the completion of running the engine torque estimation routine, i.e., a constant time from the point P2 crossing the transmission shift line to the end point P3 after finishing the manipulation of the opening of the throttle valve. However, the maximum delay time is 100 msec, small enough that the driver cannot feel the delay in the transmission shift.

If the target END transmission gear speed is the same with the transmission gear speed subsequent to passing the maximum delay time 100 msec, the TCU 40 will effect the shifting accordingly. If the target transmission gear speed returns to the initial transmission speed, the TCU 40 recognizes the shifting during the shifting, and effects the shifting of a sequence the 3rd speed->2nd speed->3rd speed or a sequence of the 4th speed->3rd speed->4th speed.

As described, the apparatus for determining optimal transmission gear speed for an automatic transmission of a vehicle of the present invention, as embodied herein, computes the engine and driving torques in response to the detection that the transmission is to be shifted up or down, determines the optimal transmission speed, and effects the shifting back to the optimal transmission speed, resulting in more rapid and smooth acceleration intended by the driver. Further it improves the life of the transmission by eliminating unnecessary transmission operations, and maximizes the overall engine efficiency.

It will be apparent to those skilled in the art that various modifications and variations can be made in an apparatus for judging a transmission compatibility of an automatic transmission vehicle and a method therefor, of the present invention without departing from the spirit or scope of the invention. It is intended that this present invention cover such modifications and variations to be within the scope of the appended claims and their equivalents.

What is claimed is:

1. An apparatus for controlling the operation of an automatic transmission for an automotive vehicle, comprising:

means for shifting the transmission from a first transmission gear speed to a second transmission gear speed in accordance with a predetermined transmission shift pattern, said predetermined transmission shift pattern including a transmission shift line at which the shifting between the first and second transmission gear speeds is initiated;

means for detecting an engine condition of the vehicle, said detecting means including means for setting an end point in the predetermined transmission shift pattern after said shifting of the transmission from the first transmission gear speed to the second transmission gear speed is initiated, means for calculating a first ratio relating to driving torques associated with said end point, and means for checking said engine condition based on the first ratio;

means for automatically shifting back the transmission from the second transmission gear speed to the first transmission gear speed based on said engine condition within a predetermined time period after said shifting of the transmission from the first transmission gear speed to the second transmission gear speed is initiated; and means for shifting said transmission shift line to coincide with said end point when the transmission is automatically shifted from the second transmission gear speed to the first transmission speed.

2. The apparatus of claim 1, wherein said first ratio is a ratio between the driving torque representing the first transmission gear speed and the driving torque representing the second transmission speed.

3. The apparatus of claim 1, wherein said detecting means further includes means for calculating a second ratio between a gear ratio representing the first transmission gear speed and a gear ratio representing the second transmission gear speed; and wherein said checking means includes means for checking said engine condition based on said first and second ratios.

4. The apparatus of claim 1, wherein said setting means includes means for defining said end point at a point in the predetermined transmission shift pattern at which the extent of the opening of a throttle valve of the engine of the vehicle does not increase after the shifting of the transmission from the first transmission gear speed to the second transmission gear speed is initiated, or, if the extent of the opening continues to increase, at which 100 msec has elapsed after the shifting of the transmission from the first transmission gear speed to the second transmission shift speed is initiated.

5. A method for controlling the operation of an automatic transmission for an automotive vehicle, comprising the steps of:

shifting the transmission from a first transmission gear speed to a second transmission gear speed in accordance with a predetermined transmission shift pattern;

detecting an engine condition of the vehicle, said detecting including setting an end point in the predetermined transmission shift pattern after said shifting of the transmission from the first transmission gear speed to the second transmission gear speed is initiated;

calculating a first ratio relating to driving torques associated with said end point, calculating a second ratio between a gear ratio representing the first transmission gear speed and a gear ratio representing the second transmission speed, and checking said engine condition based on said first and second ratios; and automatically shifting back the transmission from the second transmission gear speed to the first transmission gear speed based on said detected engine condition within a predetermined time period after said shifting of the transmission from the first transmission gear speed to the second transmission gear speed is initiated.

6. The method of claim 5, wherein said first ratio is a ratio between the driving torque representing the first transmission gear speed and the driving torque representing the second transmission speed.

7. The method of claim 5, wherein said predetermined transmission shift pattern includes a transmission shift line at which the shifting between the first and second transmission speeds occur; and further including shifting said transmission shift line to coincide with said end point when the transmission is automatically shifted from the second transmission gear speed to the first transmission speed.

8. The method of claim 5, wherein said setting step includes defining said end point at a point in the predetermined transmission shift pattern at which the extent of the opening of a throttle valve of the engine of the vehicle does not increase after the shifting of the transmission extent of the opening continues to increase, at which 100 mseconds has elapsed after the shifting of the transmission from the first transmission gear speed to the second transmission shift speed is initiated.

* * * * *

UNITED STATES PATENT AND TRADEMARK OFFICE
CERTIFICATE OF CORRECTION

PATENT NO.   : 6,064,935
DATED        : May 16, 2000
INVENTOR(S)  : Jin-Ho YOU

It is certified that error appears in the above-identified patent and that said Letters Patent is hereby corrected as shown below:

Claim 8, col. 8, line 13, after "transmission", insert --from the first transmission gear speed to the second transmission gear speed is initiated or, if the--.

Signed and Sealed this

First Day of May, 2001

Attest:

NICHOLAS P. GODICI

Attesting Officer         Acting Director of the United States Patent and Trademark Office